(12) United States Patent
Cepeda Lopez

(10) Patent No.: US 9,077,597 B2
(45) Date of Patent: Jul. 7, 2015

(54) DATA COMMUNICATION METHOD AND APPARATUS

(75) Inventor: Rafael Arcangel Cepeda Lopez, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 763 days.

(21) Appl. No.: 12/837,405

(22) Filed: Jul. 15, 2010

(65) Prior Publication Data

US 2011/0013683 A1 Jan. 20, 2011

(30) Foreign Application Priority Data

Jul. 15, 2009 (GB) .................................. 0912320.9

(51) Int. Cl.
*H04L 27/28* (2006.01)
*H04L 27/26* (2006.01)
*H04L 27/34* (2006.01)

(52) U.S. Cl.
CPC ........ *H04L 27/2614* (2013.01); *H04L 27/3411* (2013.01)

(58) Field of Classification Search
CPC ............ H04L 27/2614; H04L 27/3411; H04L 27/2623; H04L 2201/70706
USPC ......... 375/260, 264, 267, 296, 299, 347, 349, 375/279, 280, 281, 285, 298, 308
See application file for complete search history.

(56) References Cited

U.S. PATENT DOCUMENTS

| | | | | |
|---|---|---|---|---|
| 4,866,395 A | * | 9/1989 | Hostetter | 329/309 |
| 5,280,637 A | * | 1/1994 | Larosa et al. | 455/134 |
| 5,311,547 A | * | 5/1994 | Wei | 375/290 |
| 5,610,908 A | * | 3/1997 | Shelswell et al. | 370/210 |
| 5,917,384 A | * | 6/1999 | Chethik et al. | 332/103 |
| 6,130,918 A | | 10/2000 | Humphrey et al. | |
| 7,480,338 B2 | * | 1/2009 | Kang et al. | 375/261 |

(Continued)

FOREIGN PATENT DOCUMENTS

| EP | 1 357 718 A2 | 10/2003 |
|---|---|---|
| EP | 1 641 164 A1 | 3/2006 |

(Continued)

OTHER PUBLICATIONS

Liu et al. "A novel PAR reduction approach for OFDM system", May-Jun. 2004, IEEE, pp. 449-452.*

(Continued)

*Primary Examiner* — Sophia Vlahos
(74) *Attorney, Agent, or Firm* — Oblon, McClelland, Maier & Neustadt, L.L.P.

(57) ABSTRACT

A data transmission apparatus and a method of modifying a symbol constellation for use in the data transmission apparatus, wherein a processor receives a starting symbol constellation suitable for use in a frequency domain parallel modulation system and defined in a complex space. The starting symbol constellation does not necessarily comprise a symbol at a zero point in the complex space. The processor is configured to locate or move one of the symbols of the starting symbol constellation at the zero point of the complex space. The newly created symbol constellation may be stored in a storage medium, such as volatile or non-volatile storage, or immediately used for data transmission by mapping bits of data to the symbol constellation and by transmitting the mapped data to a receiver of a frequency domain parallel modulation system.

15 Claims, 8 Drawing Sheets

(56) References Cited

U.S. PATENT DOCUMENTS

| | | | |
|---|---|---|---|
| 7,961,591 B2* | 6/2011 | Abedi | 370/208 |
| 2003/0016768 A1 | 1/2003 | Huang et al. | |
| 2006/0128400 A1* | 6/2006 | Liang et al. | 455/458 |
| 2007/0165730 A1* | 7/2007 | Whinnett et al. | 375/260 |
| 2007/0248176 A1* | 10/2007 | Miyoshi | 375/260 |
| 2007/0291860 A1* | 12/2007 | Wang et al. | 375/260 |

FOREIGN PATENT DOCUMENTS

| | | |
|---|---|---|
| EP | 1 662 737 A2 | 5/2006 |
| EP | 1 791 313 A1 | 5/2007 |
| WO | WO 2004/004172 A1 | 1/2004 |

OTHER PUBLICATIONS

Pål K. Frenger et al., "Parallel Combinatory OFDM Signaling", IEEE Transactions on Communications, vol. 47, No. 4, Apr. 1999, pp. 558-567.

United Kingdom Search Report under Section 17 issued Feb. 14, 2011, in United Kingdom Application No. GB0912320.9.

United Kingdom Search Report under Section 17 (6) issued Feb. 14, 2011, in United Kingdom Application No. GB0912320.9.

Tao Jiang, et al., "An Overview: Peak-to-Average Power Ratio Reduction Techniques for OFDM Signals", IEEE Transactions on Broadcasting, vol. 54, No. 2, Jun. 2008, pp. 257-268.

Seung Hee Han, et al., "An Overview of Peak-To-Average Power Ratio Reduction Techniques for Multicarrier Transmission", Modulation, Coding and Signal Processing for Wireless Communications, IEEE Wireless Communications, Apr. 2005, pp. 56-65.

Seung Hee Han, et al., "Peak-to-Average Power Ratio Reduction of an OFDM Signal by Signal Set Expansion", IEEE Communications Society, pp. 867-871.

S. H. Müller, et al., "OFDM with reduced peak-to-average power ratio by optimum combination of partial transmit sequences", Electronics Letter, Feb. 27, 1997, vol. 33, No. 5, pp. 368-369.

G. David Forney, Jr., "Efficient Modulation for Band-Limited Channels", IEEE Journal on Selected Areas in Communications, vol. SAC-2, No. 5, Sep. 1984, pp. 632-647.

Office Action issued Aug. 21, 2012 in Japanese Patent Application No. 2010-160335 (with English language translation).

Ali A. Al-Shaikhi, et al., "Alternative Symbol Representations with Radial Symmetry for PAPR Reduction in OFDM Systems", Communications, ICC 2007, IEEE International Conference, (Jun. 2007), pp. 2942-2948.

Hanna Bogucka, "Directions and Recent Advances in PAPR Reduction Methods", 2006 IEEE International Symposium on Signal Processing and Information Technology, (Aug. 2006), pp. 821-827.

* cited by examiner (a) MEC (b) MEC Q1  (c) MEC Q2

(a) 8-PSK (b) 8-QAM

DATA COMMUNICATION METHOD AND APPARATUS

CROSS-REFERENCE TO RELATED APPLICATIONS

This application is based upon and claims the benefit of priority from UK Patent Application No. 0912320.9, filed on 15 Jul. 2009, the entire content of which is incorporated herein by reference.

FIELD

Embodiments described herein relate generally to frequency domain encoding for data transmission. Embodiments described herein relate to reducing transmission power and/or peak to average power ratio (PAPR) in frequency domain encoding of such data transmission.

BACKGROUND

It is desirable to reduce the peak-to-average power ratio (PAPR) in frequency division multiplexing and orthogonal frequency division multiplexing (OFDM). Several techniques aiming to achieve this purpose are known. A summary of these techniques can be found in Tao Jiang, and Yiyan Wu, "An Overview: Peak-to-Average Power Ratio Reduction Techniques for OFDM Signals," IEEE Transactions on Broadcasting, Vol. 54, No. 2, June 2008. Relevant techniques can be divided into three groups. Another overview paper provided by Seung Hee Han and Jae Hong Lee is entitled "An overview of peak-to-average power ratio reduction techniques for multicarrier transmission," and was published in IEEE Wireless Communications, Vol. 12, 2005. Both these documents are incorporated herein in their entireties by this reference.

A first group of peak-to-average power ratio reduction methods segment OFDM symbols into blocks. These blocks are processed independently to reduce their respective peak-to-average power ratio by applying phase rotation to the symbols on a per sub-carrier or group basis. Alternatively all of the OFDM symbols can be multiplied by a phase rotation vector or various bit interleavers can be tested to find those that provide the best peak-to-average power ratio. All these methods require the receiver to know the multiplying phase vector, the partitioning sequence and/or the interleaver in use. The main techniques in this group are Selective Mapping (SLM) scheme and a Partial Transmit Sequence (PTS) scheme.

Other methods rely on the modification of the symbol constellation used to encode the data bits. This is done by generating a set of sub-symbols related to a particular constellation symbol. These symbols are tested on a per sub-carrier basis until a satisfactory PAPR reduction is obtained. Again, some of these methods require informing the receiver about the modifications made per sub-carrier. An exemplary technique is constellation shaping.

Other techniques rely on the use of OFDM sub-carriers, or tones, that can be dynamically allocated or modified to reduce peak-to-average power ratio. The Tone Reservation (TR) and Tone Injection (TI) techniques are examples of this.

All the above techniques share the same underlying concepts of requiring a modification of data to achieve peak-to-average power ratio reduction before a time domain signal is transmitted.

S. H. Muller and J. B. Huber disclose a method in which the OFDM symbols are required to be segmented into blocks in "OFDM with reduced peak-to-average power ratio by optimum combination of partial transmit sequences," Electronics Letters, 27 Feb. 1997, Vol. 33, No. 5, the entirety of which document is incorporated herein by this reference. S. H. Han and J. H. Lee discuss a method in which constellation symbols need to be defined prior to transmission in "Peak-to-average power ratio reduction of an OFDM signal by signal set expansion," IEEE International Conference on Communications, 2004, Vol. 2. This technique is based on signal set expansion in which each point in an original signal set is associated with two or more points in an expanded signal set. Each symbol in an OFDM data block is mapped into a point among associated points in the expanded signal set so as to achieve peak to average power reduction.

DETAILED DESCRIPTION

Figure 1:
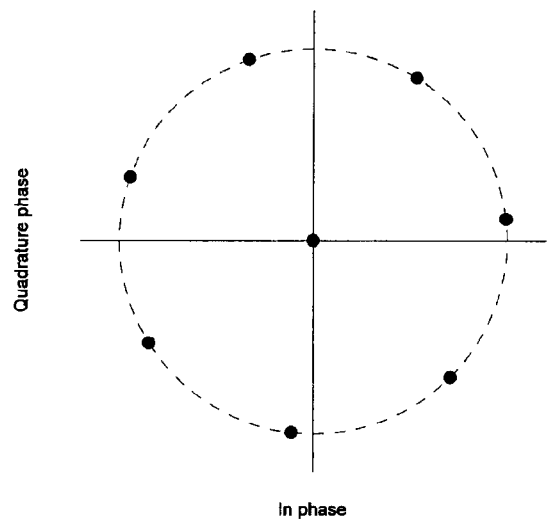
FIGS. 1 (a) to (c) show Argand complex diagrams of minimum energy constellations (MECs)
Figure 1:
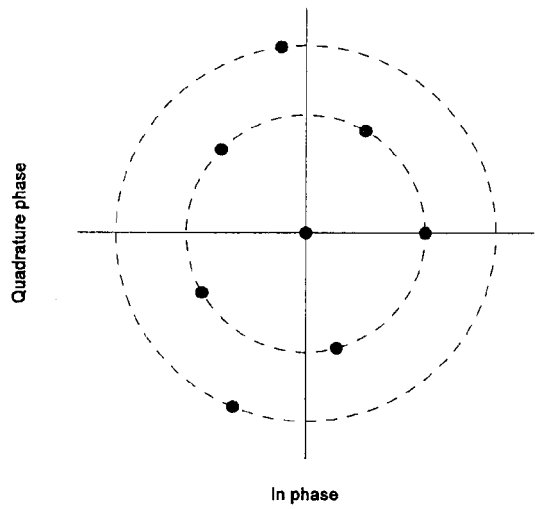
Figure 1:
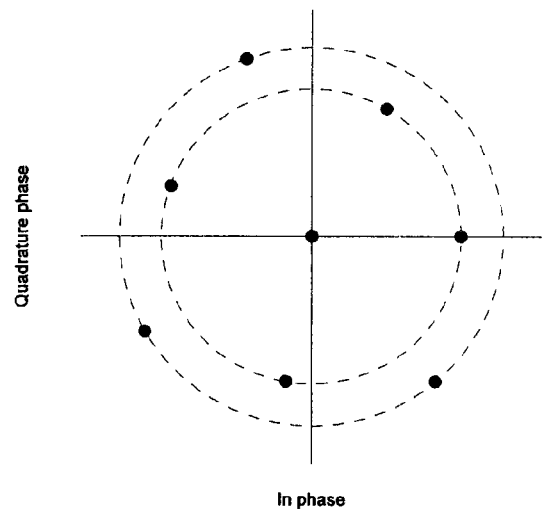

According to an embodiment there is provided a method of modifying a symbol constellation for use in a data transmission apparatus. The method comprises receiving at a processor a starting symbol constellation suitable for use in a frequency domain parallel modulation system and defined in a complex space. The starting symbol constellation does not necessarily comprise a symbol at a zero point in the complex space. The processor is used to locate or move one of the symbols of the starting symbol constellation at the zero point of the complex space. The newly created symbol constellation may be stored in a storage medium, such as volatile or non-volatile storage, or immediately used for data transmission by mapping bits of data to the symbol constellation and by transmitting the mapped data to a receiver of a frequency domain parallel modulation system.

The symbol constellation may be generated by using a standard symbol constellation, such as a PSK constellation or a quadrature amplitude modulation constellation and locating one of the symbols at the zero point of the complex space in which the symbol constellation is defined.

A processor may be used to locate some or all of the remaining signals of the starting symbol constellation closer to the zero point in the complex space than is the case in the starting symbol constellation but in a manner that allows the minimum symbol distance of the resulting constellation to be equal to or greater than the minimum symbol distance of the starting symbol constellation. The thus created symbol constellation may then be used in data transmission and bits of data may be allocated to the symbols of the symbol constellation.

G. Jr. Forney, R. Gallager, G. Lang, F. Longstaff and S. Qureshi describe in "Efficient Modulation for Band-Limited Channels," IEEE Journal on Selected Areas in Communications, Vol. 2, Issue 5, September 1984, some symbol constellation using near zero transmission. These constellations are, however, not the result of modifying a standard constellation, but a building block for HEX constellations. P. K. Frenger and N. A. B. Stevensson disclose in "Parallel Combinatory OFDM Signalling" symbol constellations in which a zero point is added to a standard constellation. This addition of an extra point, however, reduces the Ergodic distance of the constellation. Both of these publications are incorporated herein by this reference in their entireties.

The data may be for transmission via a plurality of sub-carriers of a frequency domain parallel modulation system, such as a system operating OFDM. It will be appreciate that the power reception associated with these sub-carriers, or at least two of these sub-carriers may differ. It was recognised that data bits/symbols transmitted via those sub-carriers that experience low power reception are more likely to be incorrectly received. The method may therefore further comprise allocating the symbol defined at the zero point in the complex space to a sub-carrier that is associated with a power reception that is lower than the power reception of another sub-carrier. The 'zero-symbol' may, for example, be associated with a sub-carrier selected from a group of sub-carriers comprising the half of the sub-carriers that experience the lowest power reception. Alternatively the sub-carrier may be the sub-carrier that experiences the lowest power reception. The method may further map the zero symbol to a different sub-carrier if it is determined that power reception of the previous sub-carrier has improved and/or power reception of the different sub-carrier has deteriorated. The sub-carriers may be put to better use through the reallocation of a zero symbol to a low power sub-carrier.

Alternatively the average power for a number, such as for all, of the sub-carries could be calculated and zero symbols could be allocated to such sub-carriers that may be found to have a power level below a predetermined threshold. The predetermined threshold may be derived from an average power. A further alternative of establishing channel quality could be to analyse the bit error rate of a sub-carrier after decoding and to allocate zero symbols to those sub-carriers with a high bit error rate.

According to another embodiment there is provided a method of processing data for transmission over sub-carriers in a frequency domain parallel modulation system, wherein the power reception associated with at least two of the sub-carriers differs. The method comprises allocating bits of said data to symbols of a symbol constellation that is suitable for use in the frequency domain parallel modulation system, wherein said constellation is defined in the complex space such that one of the said symbols is defined at a zero point in said complex space. In the method the symbol defined at the zero point in the complex space is allocated to a sub-carrier that is associated with a power reception that is lower than the power reception of another sub-carrier.

Different ways of allocating the data to the symbols are likely to produce different peak to average power ratios upon data transmission, as the manner in which complex symbol values interact changes with changing bit to symbol mapping.

The method may thus further allocate the bits of the data to the symbols of the constellation in a manner that reduces or minimises peak to average power ratio. It will be appreciated that it may not be essential for an allocation that minimises peak to average power ratio to be found. Instead it may be sufficient for an allocation to be determined that creates a peak to average power ratio that is lower than the maximum peak to average power ratio that may be generated by mapping the data bits to the symbols of the constellation. This may, for example, be acceptable, where a process of determining an optimum allocation, that is an allocation that minimises peak to average power ratio, would be impractical. This may, for example, be the case if the determination of the optimum allocation would take too long, require too much computational power or electric power etc.

In light of this the method may comprise determining a peak to average power ratio for a said allocation. The method may further comprise allocating the bits of the data in a manner different from the allocation for which the peak to average power ratio has been determined. The peak to average power ratio may then be determined for the different allocation. The allocation with the lower or lowest peak to average power ratio may be selected for transmission of the data. It will be appreciated that this manner of selecting a way of allocating bits or bit combinations to the symbols of a constellation is not limited to investigating two different ways of mapping bits to the symbols of the constellation. Instead any number of different ways of mapping the bits to the symbols of the constellation may be chosen up to the maximum number of possible ways of performing such bit-to-symbol mapping. The number of different ways may, however, be limited by the resources available for such investigation. The number of different bit-to-symbol mappings that are to be investigated may be determined prior to the start of the investigation, for example based on the amount of electric power and/or time and/or processor power available for the investigation. The bit-to-symbol mapping identified in this process as the bit-to-symbol mapping generating the lowest peak to average power ratio may then be selected as the bit to symbol mapping for use in data transmission. It will be appreciated that the peak to average power ratio of data that has been mapped to the symbols of a complex symbol constellation in a first manner may be determined prior to the data being mapped to the symbols of the constellation in a different manner or in plural different manners. The peak to average power ratios of the different mappings of the data may alternatively be determined after the data has been mapped to the symbols of the constellation in more than one ways.

The mapping of bits or bit combinations to the symbols of the constellation may be considered a mapping of a series of bits or bit combinations to the symbols of the constellation, wherein in different bit-to-symbol mappings the symbols may be considered as being arranged in different orders. The order of the symbols may, for example, differ in that the symbols are shifted relative to the series of bits or bit combinations by a predetermined amount, such a for example by one, two, there, four or five symbols, between different bit-to-symbol mappings. The predetermined amount may be the same between different bit-to-symbol mappings but does not have to be.

Alternatively or additionally the orders of the symbols may differ in that one symbol of one bit-to-symbol mapping has been inserted in a different place. Alternatively or additionally the orders of the symbols may have been modified by swapping symbols.

According to another embodiment there is thus provided a method of processing data for transmission in a frequency domain parallel modulation system. The method comprises mapping series of bits or bit combinations with the symbols of an OFDM constellation in two or more different orders, applying two or more different mappings to data and selecting one of the applied mappings for transmission of the data. The mapping selected may be a mapping that reduces or minimises peak to average power ratio. The symbols may be defined in a complex space. In this embodiment the zero symbol described above does not have to be used.

The mapping of the series of bits or bit combinations to the symbol constellation may be performed in a serial fashion, that is by first mapping the bits to the constellation in a first manner and subsequently mapping the bits to the constellation in one or more different ways. Alternatively, for example if the transmitter does not have power and production cost restrictions, the mapping can be performed in a parallel process.

The selection of the bit-to-symbol mapping may not be limited to a selection for the reduction of peak to average power ratio. Peak to average power ratio as well as the overall transmit power does not only depend on the bit-to-symbol mapping used but also on the data that is to be transmitted. A bit-to-symbol-mapping that may provide desirable peak to average power ratio and/or transmit power characteristics for particular data may not be equally well suited to the transmission of other data. The bit to symbol mapping that is to be used may thus be selected such that the transmit power used is reduced or minimised. The above discussed ways of modifying bit-to-symbol mapping may moreover also be applied for this purpose.

The above described methods can be applied to symbol constellations of any size.

According to another embodiment there is provided a method of creating a symbol constellation for use in a frequency domain parallel modulation system, the method comprising modifying a starting symbol constellation defined in an Argand diagram by placing one of the symbols at a zero point of the Argand diagram and modifying the positions of at least some of the other symbols of the starting symbol constellation in the Argand diagram while maintaining a minimum symbol distance of the starting symbol constellation, wherein the starting symbol constellation is a QAM, PSK or HEX symbol constellation.

The embodiments are, however, not limited to the above described methods and further expends to data processing apparatus. In accordance with another embodiment there is thus provided an apparatus arranged to modify a symbol constellation for use in data transmission in a frequency domain parallel modulation system. The apparatus comprises means for obtaining a starting symbol constellation suitable for use in the frequency domain parallel modulation system and defined in a complex space. The starting symbol constellation does not comprise a symbol at a zero point in the complex space. The apparatus also comprises a processor arranged to locate or move one of the symbols of the starting symbol constellation at or to the zero point of the complex space. The processor may further be arranged to locate some or all of the remaining signals of the starting symbol constellation closer to the zero point in the complex space so that the minimum symbol distance of the resulting constellation is equal to or greater than the minimum symbol distance of the starting symbol constellation. The apparatus may further be arranged to allocate bits of data to the symbols of the symbol constellation.

The data may be for transmission via a plurality of sub-carrier of the frequency domain parallel modulation system, wherein the power reception associated with at least two of the sub-carriers differs. The apparatus may further be arranged to allocate the symbol defined at the zero point in the complex space to a sub-carrier that is associated with a power reception that is lower than the power reception of another sub-carrier. According to another aspect of the embodiment there is provided a data processing apparatus arranged to allocate bits of data to symbols of a symbol constellation for transmission using a plurality of sub-carriers of a frequency domain parallel modulation system, wherein the power reception associated with at least two of the sub-carriers differs and wherein said symbol constellation is defined in the complex space such that one of the said symbols is defined at a zero point in said complex space. The apparatus is arranged to allocate said symbol defined at the zero point in the complex space to a sub-carrier that is associated with a power reception that is lower than the power reception of another sub-carrier.

The apparatus may further form part of a system that comprises means arranged to determine an amount of power reception of used sub-carriers. Based on information provided by such power determining means the zero point in the complex-space may be associated with a sub-carrier that has been determined as having low or the lowest power reception.

The apparatus may further be arranged to allocate said bits of said data to said symbols of the constellation so as to minimise a peak to average power ratio. The apparatus may further comprise means for determining a peak to average power ratio for different ways of allocating bits to symbols of the constellation. The means for determining peak to average power ratio may be arranged to apply the bit-to-symbol mapping to data that is to be transmitted to determine peak to average power ratio for the data. The apparatus may further comprise means for selecting the bit-to-symbol mapping that provides minimum peak to average power ratio.

Information on different ways of bit-to-symbol mapping may be stored in a storage device that forms part of the apparatus or that can provide the information to the apparatus. The storage device may, for example, comprise a plurality of indices, each index linking the bits or bit combinations with the symbols in the constellation in a particular manner. The contents of the indices may change in accordance with the above discussed different ways of mapping bits-to-symbols. The apparatus may alternatively comprise a means for modifying bits to symbol mapping based on a predetermined constellation on the fly.

In accordance with another embodiment there is provided a data processing apparatus arranged to map a series of bits or bit combinations to symbols of a symbol constellation suitable for use in a frequency domain parallel modulation system in two or more different orders. The apparatus is further arranged to apply two or more of the different mappings to data and to select one of the applied mappings for transmission of the data on a channel or channels of the frequency domain parallel modulation system. It will be appreciated that the bits of data can be mapped to the symbol constellation in the different manners in a parallel process using plural processors. This reduces the overall time required for the mapping process. Alternatively the bits of data can be mapped to the symbol constellation in the different fashions in a sequential process. This will likely come at the cost of increased processing time but will require less processing resources.

The above discussed techniques provide the advantage of reducing transmit power and, in the case of peak to average power rate reduction, the size of look-up tables, mathematical calculations and additional digital signal processing modules that may be required at the transmitter and receiver.

Suitable frequency domain parallel modulation systems may be systems employing frequency domain air interfaces such as systems employing OFDM, OFDMA, OFDM-PRP or OFDM/OQAM/IOTA or similar frequency domain encoding systems.

According to another embodiment there is further provided a complex symbol constellation for use in a frequency domain parallel modulation system. The complex symbol constellation corresponds to a symbol constellation selected from a QAM symbol constellation and a PSK symbol constellation and comprises a symbol that has been moved to a zero point in the complex space in which the selected symbol constellation is defined. According to another embodiment there is provided a storage medium comprising such as symbol constellation.

According to further embodiment there are provided a computer program for execution in a processor and arranged to perform the steps of the methods described above when executed on a processor and a storage means comprising such a computer program.

The transmit power and/or PAPR in frequency domain parallel modulation systems, such as OFDM, OFDMA, OFDM-PRP or OFDM/OQAM/IOTA, can be reduced in an exemplary method by modifying a constellation of symbols by replacing one of its complex symbols by no transmission of data or a "zero symbol". This modification serves two purposes. It firstly reduces the transmitted energy. The modification can secondly assign a zero symbol to the group of bits with major repetition on the sub-carriers with low energy at the receiver, if channel state information (CSI) is available at the transmitter.

Some examples of varied symbol constellations are shown in the Argand diagrams of FIGS. 1(a) to (c). The original constellations are shown in the Argand diagrams of FIGS. 2(a) and (b). The imaginary part of the symbols of the constellations extend in the direction of the ordinates used in FIGS. 1 and 2, while the real parts of the symbols of the constellation extend in the direction of the abscissae. The constellations shown in FIGS. 1(a) to (c) can be referred to as minimised energy constellations (MECs). The first exemplary minimised energy constellation shown in FIG. 1(a) is based on the eight symbol phase shift keying (8-PSK) constellation shown in FIG. 2(a), wherein one of the eight symbols is placed at the centre of the diagram, that is at a zero position, so that both the real and imaginary parts of the symbol are zero. Moving a symbol to the centre of the diagram permits a reduction in the overall diameter of the diagram, while maintaining at the same time the Ergodic distance between the symbols of the constellation of the original constellation. The energy required for the transmission of each symbol of the modified constellation is thus reduced when compared to the energy required for the transmission of the corresponding symbol of the original constellation.

The transmit power associated with all of the symbols may be reduced when modified symbol constellations are used in data transmission. This reduction in transmit power can be achieved without impediment to the Bit-Error-Rate performance of the method or a system incorporating the method. The data rate achieved by the method is maintained when compared to the data rate achieved by a similar known method, such as tone reservation, as the PAPR reduction methods do not need to null sub-carriers or allocate data sub-carriers to reduce PAPR or transmitted power.

The other two exemplary constellations shown in FIGS. 1(b) and (c) respectively (labelled 8-MEC Q1 and 8-MEC Q2 respectively) are based on an eight quadrature amplitude modulation (8-QAM) constellation shown in FIG. 2(b). The 8-QAM constellation of FIG. 2(b) has been modified in two different ways to include a zero symbol. The 8-QAM constellation of FIG. 2(b) comprises four symbols in the outer ring and four symbols in the inner ring. The first modification takes one of the outer symbols and place it in the inner ring and takes a second outer symbol and place it at the origin. In the second modification only one of the outer symbols is taken and place at the origin. In both modifications the distance between the resulting symbols is maximised to obtain the best possible Ergodic distance. As all of the minimum energy constellations shown in FIGS. 1(a)-(c) comprise zero signals/symbols, the power required for transmitting data using these symbols is reduced when compared to the power required for transmitting data using either of the reference symbol constellations shown in FIGS. 2(a) and (b).

When altering the symbol constellation to provide a minimum energy constellation the signal that forms the zero signal may be allocated to the bit combination that in the original constellation requires the most repetitions, for example on a sub-carrier with bad channels. Such bit combinations are the bit combinations most likely to be interpreted incorrectly at the receiver. By allocating these bit combinations to the zero symbol such incorrect interpretation can be avoided and the zero symbol can be decoded in situations where a corresponding energised constellation symbol of the original symbol constellation, such as a symbol constellation shown in FIG. 2, would be decoded incorrectly. To enable a choice between the signals in a symbol constellation, however, channel state information is required at the transmitter. Such allocation is particularly advantageous if a reduction in peak to average power ratio is not the main requirement.

The peak to average power ratio frequency domain parallel modulation systems/systems employing frequency domain air interfaces, such as systems employing OFDM transmission, may also be reduced by redistributing the symbols in a symbol constellation or by changing the bit to symbol mapping. This may be achieved by the use of one or both of two processing methods, which will be described in the following with reference to FIG. 3.

Figure 3:
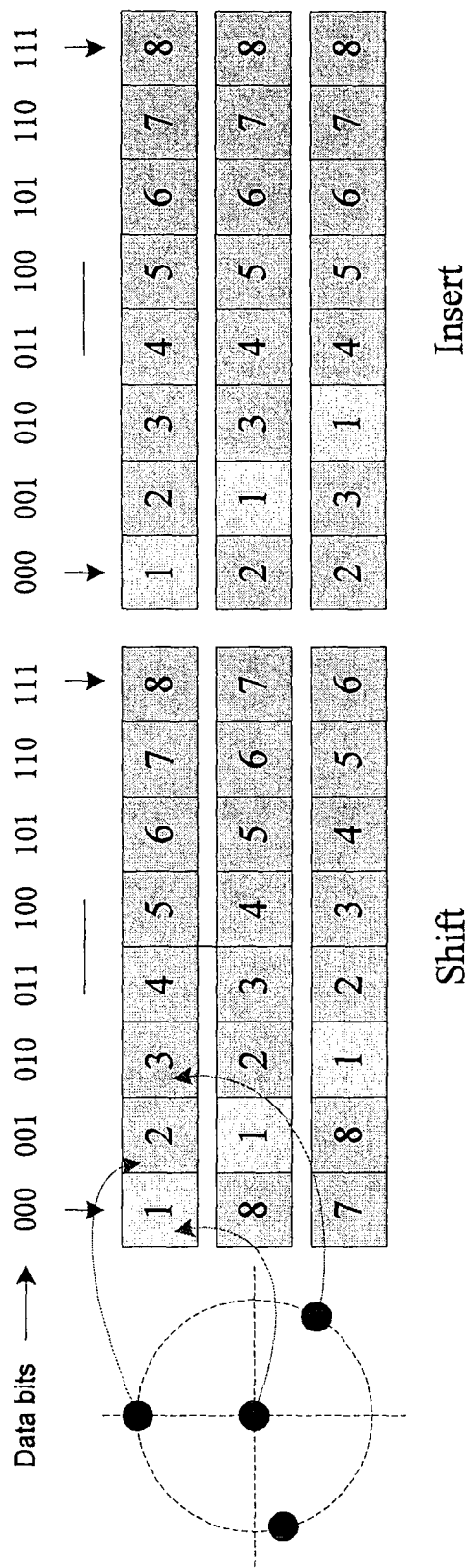
FIG. 3 illustrates an exemplary PAPR reduction methods that modifies the bit-to-symbol mapping.

In the method labelled "Shift" in FIG. 3 the mapping between bit combinations and symbol constellations is shifted by one signal at a time. Once the constellation has been shifted each of the data bits is mapped to a constellation symbol different from the constellation symbol to which it had previously been mapped. Altering bit to symbol mapping in this fashion facilitates finding a manner of mapping bits to symbols in which interactions between complex symbol values on sub-carriers are such that they do not add in a constructive manner, thereby reducing the peak to average power ratio. It will be appreciated that the embodiments are not limited to shifting by a single symbol only. Instead any suitable shift amount may be utilised.

The second manner of changing the symbol mapping is labelled "Insert". In this technique an index to a predefined symbol in the symbol constellation is inserted into a position different from the original position in the symbol constellation. This again causes a change in the mapping of data bits to different symbols. As can be seen from FIG. 3, however, the "Insert" technique does not necessarily change the mapping of all of the data bits to symbols in the constellation. FIG. 3 in particular shows that, the only data bits that are mapped to different constellation symbols after the insertion technique has been applied are a first data bit that has been moved, a second data bit that had occupied the position to which the first data bit has been moved and the data bits occupying positions between the original positions of the first and second data bits. These 'intermediate' data bits in particular have been displaced, together with the second data bit, towards the original position of the first data bit. Changing bit to symbol mapping in this fashion again allows finding a manner of mapping bits to symbols in which interactions between complex symbol values on sub-carriers are such that they do not add in a constructive manner, thereby reducing the peak to average power ratio.

The above described different ways of changing the symbol mapping can also be combined so that all symbols in the symbol constellation are shifted and so that one or more of the symbol are also taken an inserted in a different position, thus providing a more flexible way of changing the symbol mapping.

One known PAPR reduction method is the selective mapping (SLM) method described, for example, in the paper by Jiang et. al. incorporated by reference above. This method, however, performs only one bit-to-symbol encoding and requires the use of several phase rotation vectors that are used to multiply the OFDM symbol to be transmitted. The SLM method thus requires additional look-up tables at the transmitter and receiver. In addition, SLM needs a complex multiplier to change the phase of each subcarrier in the OFDM symbol. The computation of PAPR for each data set is similarly complex for both the method disclosed in FIG. 3 and for SLM. It will be appreciated that the method disclosed in FIG. 3 do not require the complex multiplications called for in the SLM method and also avoids the use of the look-up tables and additional interleavers for reallocating constellation symbols required by SLM. Moreover, the FIG. 3 methods do not require any extra computations at the receiver. This is because, once the symbol constellation used for transmission is known and has been communicated to the receiver, the decoding process can be follow in a conventional OFDM way. The only additional component required in a system implementing the FIG. 3 methods, when compared to a standard OFDM system, is a PAPR calculator. The need for more complex calculation modules, such as those required by SLM is avoided. These characteristics make the FIG. 3 methods suitable for used in low cost devices.

The symbol constellation chosen by the transmitter for the transmission of the data needs to be communicated to the receiver. The amount of feedback of this nature that is required to be provided is determined by the number of tested bit-to-symbol mappings. This information could be transferred from transmitter to receiver by using a set of orthogonal training sequences, in which each sequence corresponds to a particular constellation, or by correlating known information such as the identification (ID) of the received OFDM symbol or the receive terminal's ID to detect the new symbols' distribution.

The method of FIG. 3 in contrast only requires a dynamic bit mapping modifier that points bits to different constellation symbols, for example according to pre-defined modifications. Thus, the need for look-up tables and additional complex multiplications is avoided at the transmitter and the receiver. These characteristics allow the methods of FIG. 3 to be quickly implemented in devices using OFDM methods as the only extra modules that may be required are a PAPR calculator and a bit-to-symbol mapping modifier. At the receiver, the only additional operation required is the identification of the symbol constellation used for data transmission.

Figure 4:
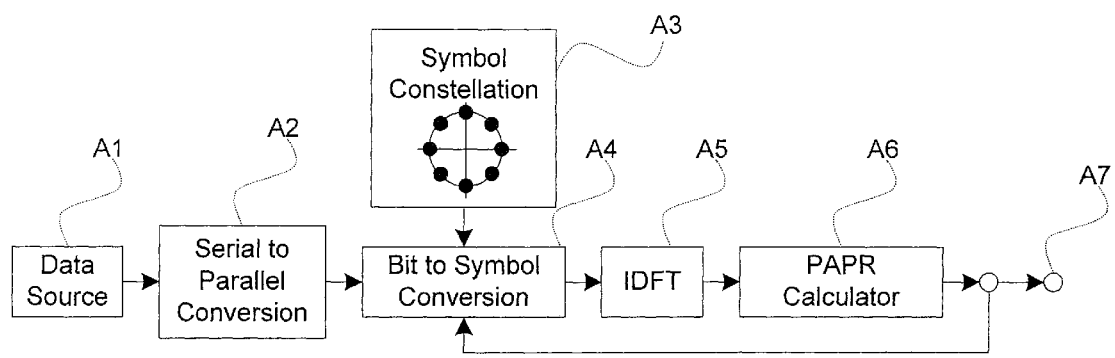
FIG. 4 shows a sequential process for data encoding and PAPR calculation.

Once the symbol constellation that is to be used by the transmitter has been defined, the bit combinations can be encoded using the generated symbol constellation. The arrangement illustrated in FIG. 4 may be used for this purpose. In this arrangement the transmitter receives or generates a data stream that is to be transmitted. This data receipt is illustrated by data source A1. The received/generated data or a part of is then converted into parallel data according to the size of the OFDM symbol in a serial to parallel converter A2. The parallel binary data bit combinations provided by the serial to parallel converter A2 are then mapped to complex symbols by the bit to symbol conversion unit A4. The previously determined symbol constellations stored in A3 are used for this purpose. The encoded data is then converted to the time domain by an inverse discrete Fourier transform (IDFT) module A5 and the peak-to-average power ratio PAPR of the resulting data is calculated in PAPR calculator A6.

A particular data stream can be mapped to a symbol constellation in various different way, as explained with reference to FIG. 3. Information relating to these different ways of mapping are stored in memory A3. Mapping data bits to a symbol constellation in these different ways creates different streams of encoded data, each stream encoding the same input data in a different way. The signal with the minimum PAPR can be found by trying the various ways of mapping to the symbol constellations stored in A3 on the data and calculating the resulting PAPR using the PAPR calculator A6. A feedback mechanism is provided to indicate to the bit to symbol conversion unit A4 which of the different bit to symbol mappings is the bit to symbol mapping that is to be used for transmission of data. The signal with the minimum PAPR is then forwarded, at A7, for further processing and transmission. Depending on the capabilities of the transceiver, the data can either be encoded by the stored symbol constellations in a sequential order, that is using one way of bit to symbol mapping after the other, or by encoding various copies of the data stream that is to be encoded with a corresponding number of ways of bit to symbol mapping in a parallel process.

It will be appreciate that the advantage of potentially reduced peak to average power ratio may be provided even if the zero symbols of the earlier described aspect are not used. The symbol constellation used may thus be a standard symbol constellation for which the bit-to-symbol mapping is modified in the above discussed manner.

In the following a serial process for finding the symbol constellation that gives the best possible peak-to-average power ratio for a given OFDM symbol is described with reference to FIG. 5. After the start of the algorithm in step (01) the process determines if power reduction is desired (step (02)). If this is the case, a symbol constellation with a zeroed symbol (such as one of the symbol constellations shown in FIGS. 1 (a) to (c)) is chosen for transmission in step (03). If it is determined in step (02) that power reduction is not desired, then step (03) is skipped by the process and the process proceeds from step (02) directly to step (04).

In step (04) it is determined whether or not a reduction in peak to average power ratio (PAPR) is desired. If this is the case then the algorithm proceeds to step (05), otherwise the algorithm is terminated in step (15).

Figure 5:
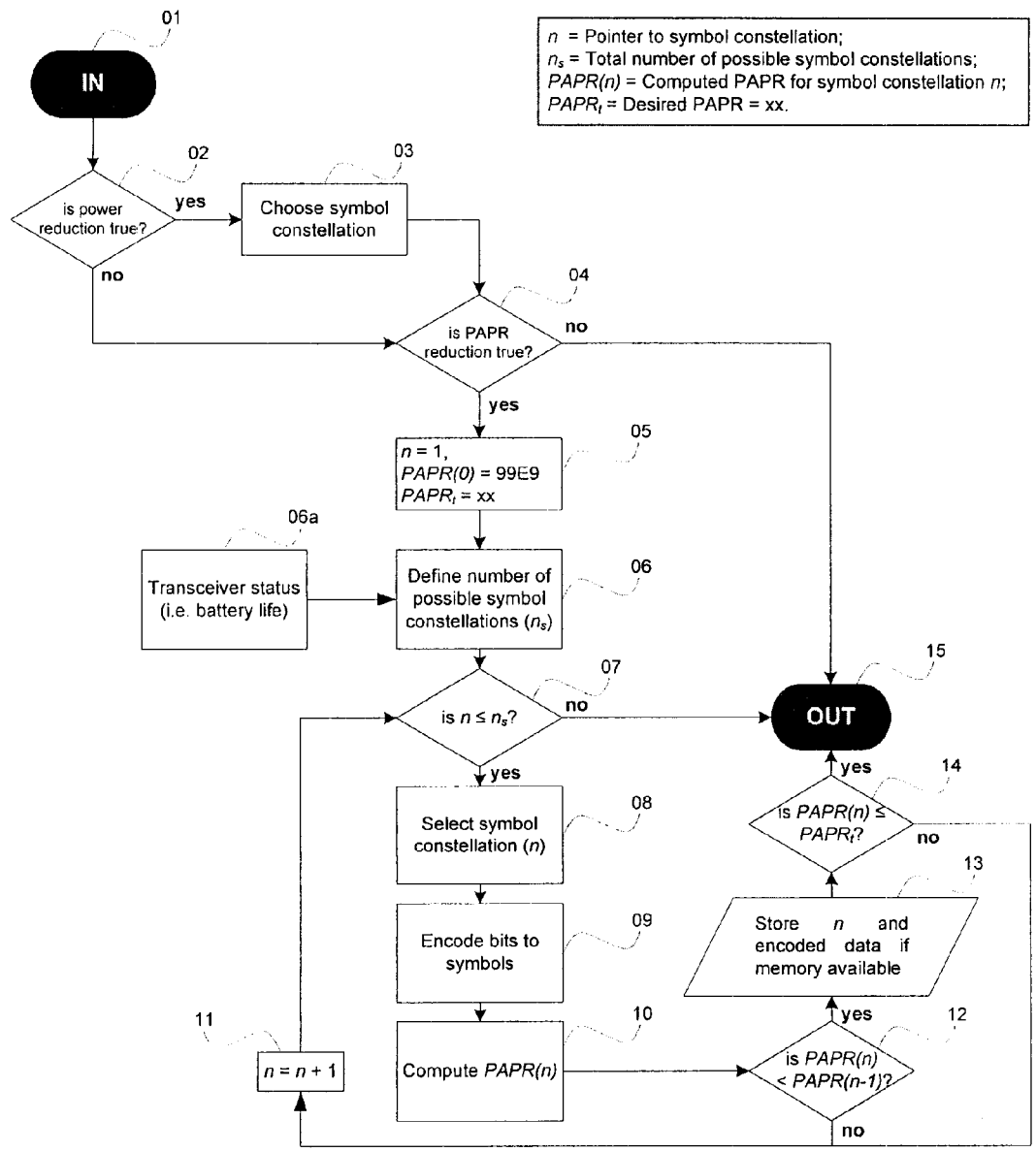
FIG. 5 illustrates an algorithm for a serial processing transceiver using a proposed PAPR reduction method.

The algorithms illustrated in FIG. 5 makes use of a pointer n, which points to one of a number ns of different symbol constellations that may be used in trying to reduce peak-to-average power ratio. In the system illustrated in FIG. 4 these symbol constellations are stored in the memory A3. The symbol constellation chosen for the next attempt at reducing peak-to-average power ratio is identified/indexed by the value of the pointer n. The pointer n is set to a starting value of n=1 in step (05), so that initially the first one of ns available constellations is chosen. In step (05) an arbitrary value is assigned to a variable PAPR(0). The value is sufficiently large to ensure that actual peak-to-average power ratio calculated for encoded bit combinations cannot exceed it. Additionally a desired peak-to-average power ratio threshold is defined in variable $PAPR_t$.

Steps (07) to (14) sequentially compute the peak to average power ratio for a number of different possible symbol constellations. The number of possible symbol constellations is of course limited by the number of available symbol constellations. Other limitations may, however, also apply. The remaining battery life of a transceiver may, for example, be too low to support the computation of peak to average power ratio for all availably symbol constellations. In this case it is desirable to limit the number of symbol constellations for which the peak to average power ratio is computed. Step (06) applies such a limitation by setting a maximum number of possible symbol constellations that the receiver is permitted to consider in steps (07) to (14). This setting step may make use of any additional information, for example information regarding the status of the transceiver, that could or is likely to impact on the maximum number of constellations that should sensibly be considered. Such information may be derived from an information source in a step (6a). In step (07) the process investigates if this maximum number of symbol constellations has already been reached and, if so, proceeds to terminate the algorithm in step (15).

If the number of symbol constellations considered is lower than the chosen maximum number of symbol constellations that are to be considered, then the $n^{th}$ symbol constellation is chosen for investigation in step (08). This $n^{th}$ symbol constellation is then used to encode the bit to which the symbol constellation is to be applied to symbols in step (09) and the peak to average power ratio for this particular set of encoded bits is then calculated in the time domain in step (10). The newly computed peak to average power ratio is then compared to the previously computed smallest peak to average power ratio in step (12). If the newly computed peak to average power ratio is smaller than the smallest peak to average power ratio computed in the previous executions of the relevant ones of steps (07) to (14), then the number n of the symbol constellation used to generate the bits giving rise to the current peak to average power ratio PAPR(n) is stored and the data may be encoded if the required memory is available in step (13). It will of course be appreciated that the data can alternatively be encoded after the FIG. 5 algorithm has been terminated, that is once the optimum symbol constellations has been identified. Proceeding in this manner has the advantage that the data only needs to be encoded once the optimum symbol constellation has been identified, rather than every time a symbol constellation has generated a peak to average power ratio that is smaller than the previous smallest peak to average power ratio.

If it is found that the current peak to average power ratio PAPR(n) is smaller than the previously computed peak to average power ratio, then the current peak to average power ratio PAPR(n) is compared to the threshold peak to average power ratio $PAPR_t$ set in step (05). If this comparison indicates that the current peak to average power ratio PAPR(n) is smaller than or equal to the threshold peak to average power ratio $PAPR_t$, the FIG. 5 algorithm proceeds to step (15), where it terminates.

If the current peak to average power ratio PAPR(n) is not found to be lower than the previously computed peak to average power ratio PAPR(n−1) or if the current peak to average power ratio PAPR(n) is found to not be smaller or equal to the threshold peak to average power ratio $PAPR_t$ then the algorithm proceeds to step (11), where the counter n is incremented by one so that the next available symbol constellation can be chosen in the next execution of the relevant parts of steps (07) to (14).

Once step (15) has been reached, it is considered which of the symbol constellations that have been investigated has generated the smallest peak to average power ratio and the symbol constellation that has given rise to this smallest peak to average power ratio is chosen for encoding the bits for transmission.

It will be appreciated that, although the FIG. 5 algorithms computes the peak to average power ratios achieved by various available symbol constellations in a sequential fashion, it falls within the skill of the person skilled in the art to arrange for the parallel computation of the peak to average power ratios of two or more or even of all the available symbol constellations.

Any of the above discussed methods may further comprise communicating symbol allocation information to a receiver. The methods may be considered methods of reducing peak-to average power ratio and/or methods of reducing peak to average power ratio that do not require additional post-processing at the receiver once the complex symbol constellation is known. The methods may provide the advantage that the amount of computational resources required for putting it into effect is greatly reduced when compared to known techniques. The implementation of the techniques does not require additional complex multiplications per sub-carrier at the transmitter or receiver, as is the case in the known signal mapping (SLM) technique. The methods may be practiced in a frequency domain parallel modulation system, such as a system arranged for OFDM data transmission, for example in a transmitter for such transmission or in an apparatus supplying bit-to-symbol mapping information to such a transmitter. The transmitter may form part of wireless LAN, a wireless personal area network or find use in ultra wideband systems.

Computer simulations have been performed to investigate the performance of the above proposed method. The transmission of OFDM symbols with 128 sub-carries, of which 100 sub-carriers contained data was simulated. The bandwidth of the transmitted signal was 528 MHz and the air interface is modelled by the line of sight (LOS) UWB channel propagation model, CM1, proposed to the 802.15.3a group, for example as disclosed by A. Molisch, D. Cassioli, C.-C., Chong, S. Emami, A. Fort, B. Kannan, J. Karedal, J. Kunisch, H. Schantz, K. Siwiak and M. Win, "A Comprehensive Standardized Model for Ultrawideband Propagation Channels Antennas and Propagation", IEEE Transactions on, 2006, 54, 3151-3166, the entirety of which is incorporated herein by this reference.

Figure 2:
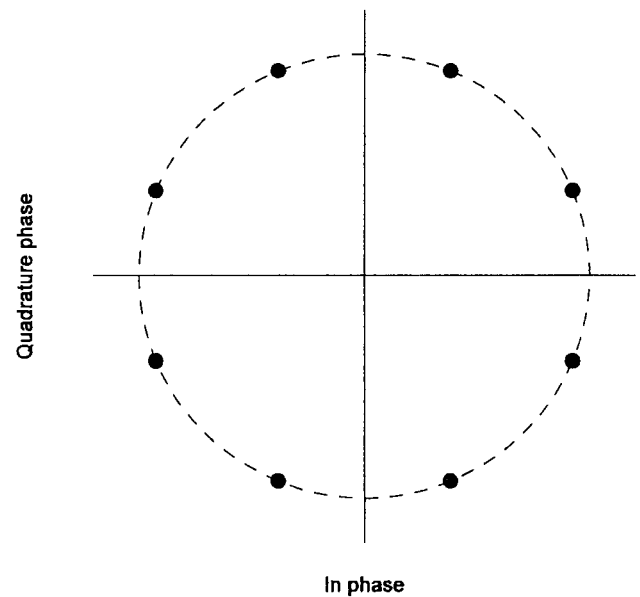
FIGS. 2 (a) and (b) show Argand complex diagrams of reference symbol constellations of size eight on which the minimum energy constellations shown in FIG. 1 are based.
Figure 2:
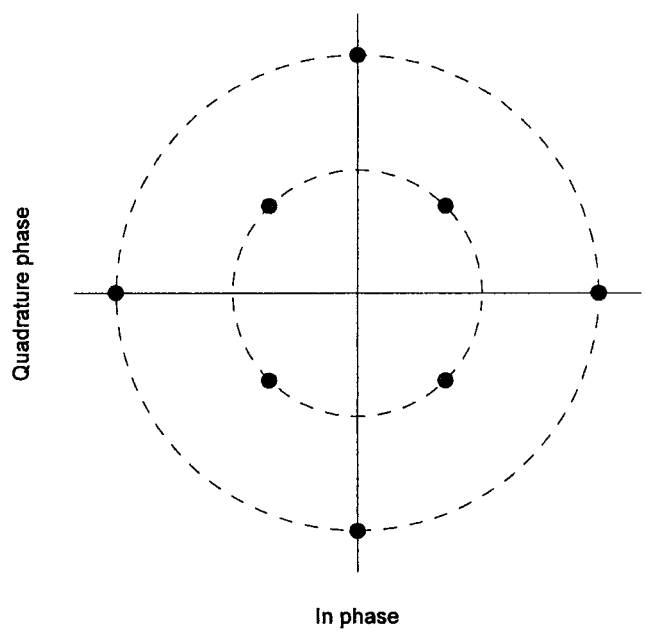
Figure 6:
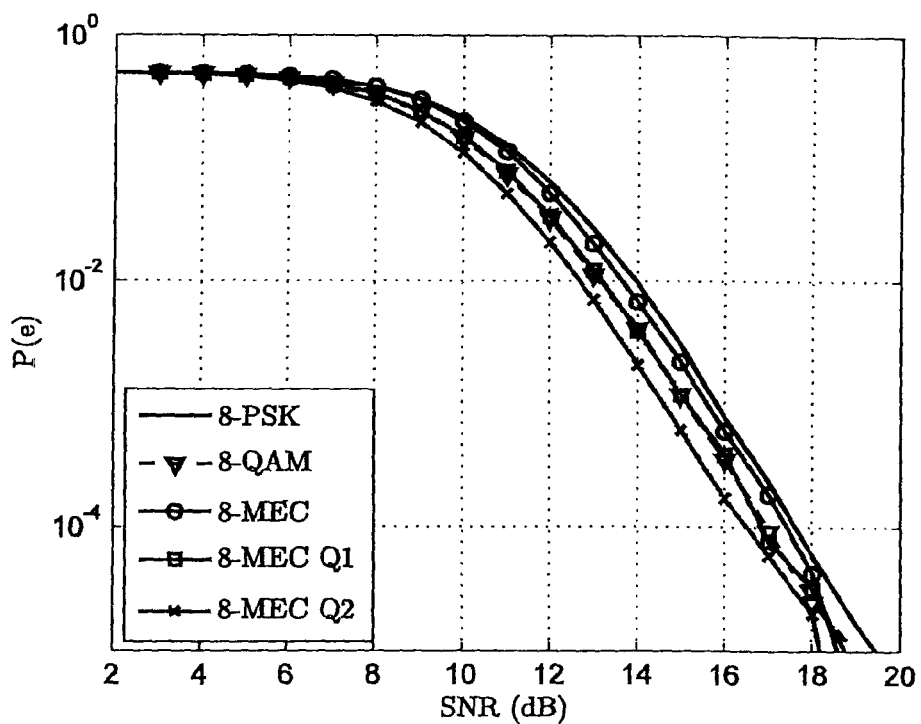
FIG. 6 shows a diagram comparing BER for different symbol constellations of size 8 for an OFDM symbol with 128 sub-carriers over a 528 MHz bandwidth UWB channel.

A first computer simulation compared the bit error rate (BER) of the OFDM symbols when using the different eight symbol constellations shown in FIGS. 1 and 2 respectively. FIG. 6 shows the results of this comparison and plots the probability P(e) of a symbol being received in error over signal to noise ratio SNR. FIG. 6 illustrates that in addition to providing a reduction in transmit power the symbol constellations proposed in FIGS. 1 (a) to (c) provide a BER performance that is similar or better than the BER performance of the corresponding symbol constellation of FIG. 2 (a) or (b). The 8-MEC symbol constellation shown in FIG. 1(a), for example, is based on the 8-PSK symbol constellation of FIG. 2(a) and can be seen to outperform the 8-PSK symbol constellation in terms of BER. The reason for this is that the minimum Ergodic distance between symbols is increased in the symbol constellation shown in FIG. 1(a).

As can further be seen from FIG. 6, the 8-MEC Q1 symbol constellation shown in FIG. 1 (b) produces the same BER performance as the 8-QAM constellation shown in FIG. 2(b), on which it is based. The 8-MEC Q2 symbol constellation shown in FIG. 1(c), however, presents better BER results than 8-QAM symbol constellation of FIG. 2(b), on which it is based.

It should be noted that the symbol constellations have been normalized so that they have the same power. The minimum energy constellations symbol constellations of FIGS. 1(a) to (c) are, however, energised, on average, seven times instead of eight times as one of the symbols of the minimum energy constellations of FIGS. 1(a) to (c) does not require energization.

FIG. 6 shows that the replacement of an active constellation symbol by non-transmission does not induce significant degradation in the communications link, but helps to reduce the averaged transmit power. As mentioned above the zero symbol may moreover be allocated to some of the low energy sub-carriers, so that instances of erroneous decoding are less likely.

Figure 7:
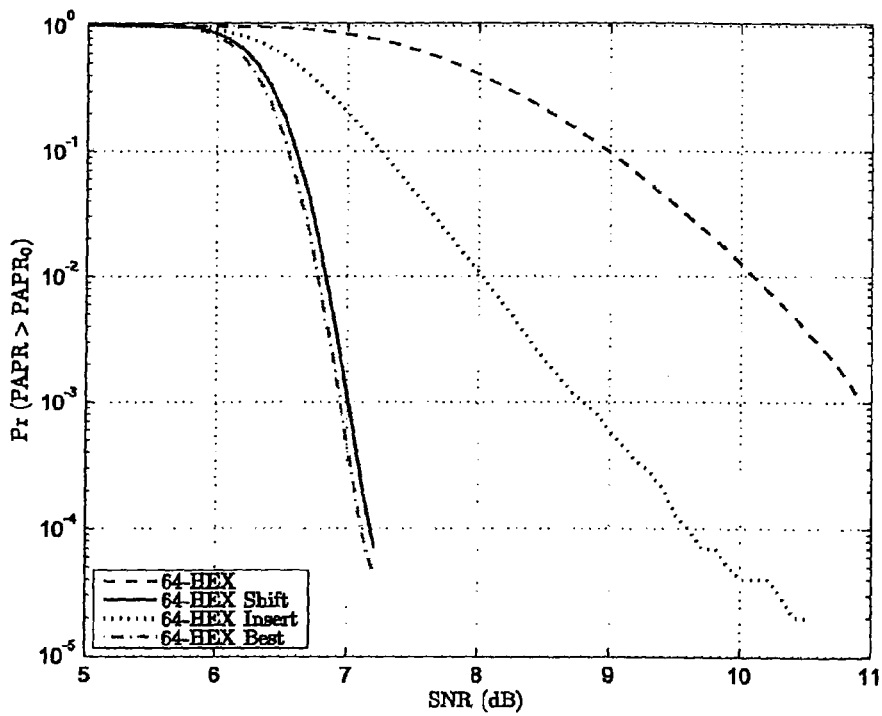
FIG. 7 shows a diagram comparing cumulative distribution functions (CCDF) of PAPR for the PAPR reduction methods introduced with reference to FIG. 3 with CCDF achieved without PAPR reduction.

FIG. 7 show the complementary cumulative distribution function (CCDF) of the PAPR (expressed as the probability of the peak to average power ration PAPR being greater than the symbol clip probability $PAPR_0$) for the same OFDM symbol constellation, but this time using a 64-HEX symbol constellation. FIG. 7 illustrates the gain in peak to average power ratio that can be obtained by using the methods proposed above with reference to FIG. 3. The 'shift' method illustrated in FIG. 3 is labelled '64-HEX shift' in FIG. 7, the 'insert' method of FIG. 3 is labelled '64-HEX insert' in FIG. 7 and the method combining shifting and inserting is labelled '64-HEX best' in FIG. 7. FIG. 7 illustrates reductions in peak to average power ratio when compared to a system in which no reduction in the peak to average power ratio is attempted (labelled 64-HEX in FIG. 7).

FIG. 7 shows that, for the particular symbol constellation on which the simulation has been based, the 'shift' and 'best' methods achieve a peak to average power reduction of approximately 4 dB at $Pr(PAPR>PAPR_0)10^{-3}$. However, the 'insert' method is also important since it works better than the shift method for other symbol constellations, as is shown in FIG. 9.

Figure 8:
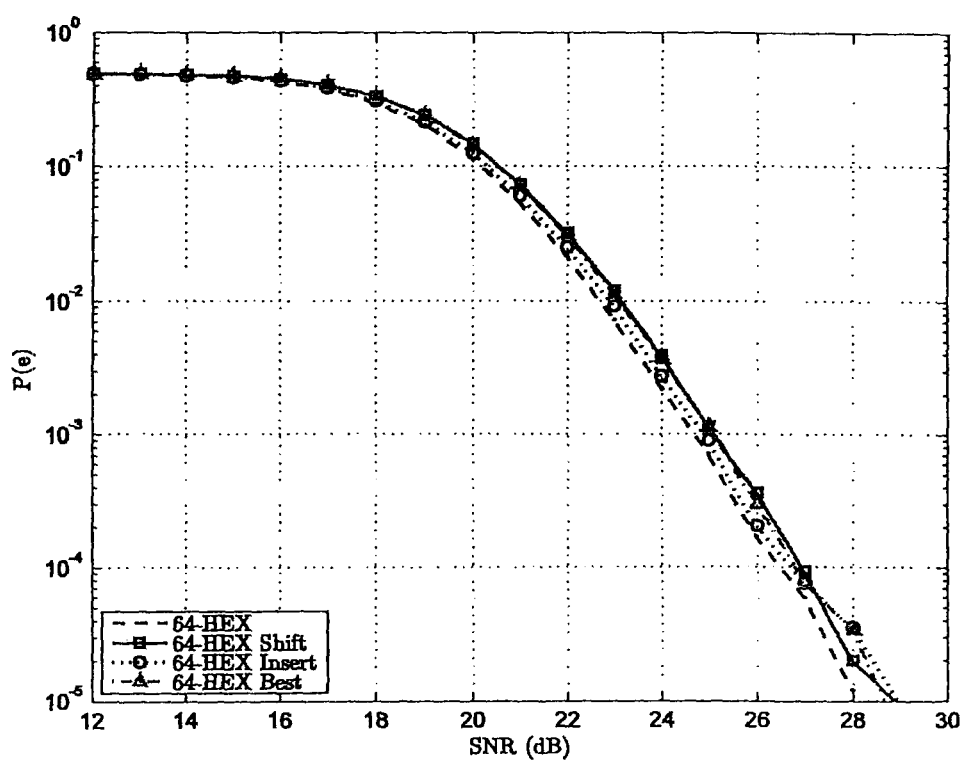
FIG. 8 shows BER performance of the PAPR reduction methods introduce with reference to FIG. 3 and compared to BER if PAPR reduction is not facilitated.

FIG. 8 shows the result of an analysis of the degradation in the bit error rate that occurs when the proposed peak to average power reduction method are used for the 64-HEX symbol constellations that formed the basis of the simulation discussed above with regard to FIG. 7. FIG. 8 plots the probability of a symbol being received in error P(e) over signal to noise ratio SNR. As can be seen from FIG. 8, all of the propose peak to average power reduction methods cause a degradation in bit error rate of about 0.4 dB when compared to the original symbol constellation. The principal reason for this performance reduction is the removal of the Grey encoding, which increases the probability that bits are erroneously decoded. The shift in the curves shown in FIG. 8 would be different for different symbol constellations.

Figure 9:
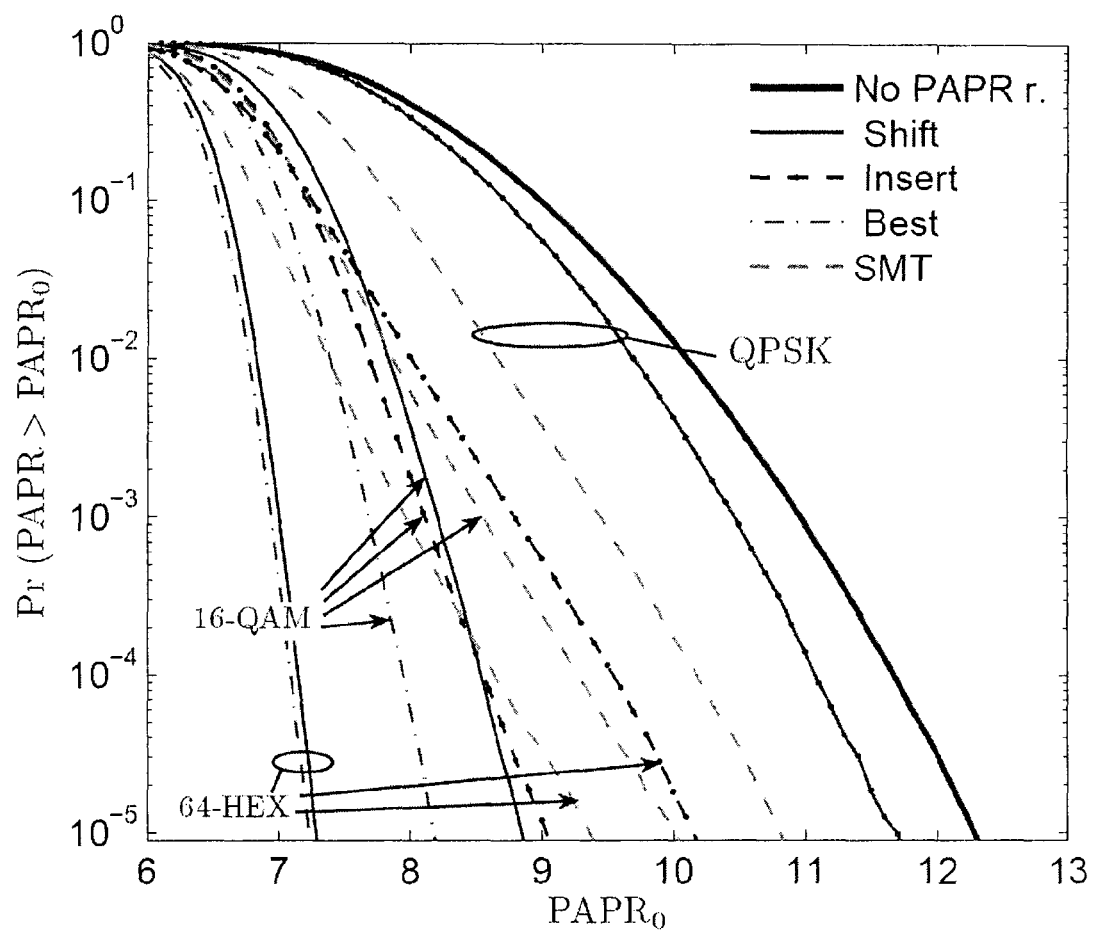
FIG. 9 plots CCDF over $PAPR_0$ for QPSK, 16-QAM and 64-HEX symbol constellations.

FIG. 9 plots CCDF over $PAPR_0$ for QPSK, 16-QAM and 64-HEX symbol constellations corrected with the above described "Shift" and "Insert" methods as well as a method combining "Shift" and "Insert". This further method is labelled "Best". The dashed lines labelled "SMT" provide a comparison to the above described selective mapping technique.

It will be appreciated that the above description of the present invention is made by way of example only to illustrate the present invention. The person skilled in the art will appreciate that the present invention is not limited by the examples provided above. The person skilled in the art will, for example, appreciate that the symbol constellations used are not limited to those shown above and that other known symbol constellation types may form the basis for modification. The symbol constellations may further have any suitable size.

While certain embodiments have been described, the embodiments have been presented by way of example only, an area not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of modifying a symbol constellation for use in a data transmission apparatus comprising the steps of:
   receiving at a processor a starting symbol constellation comprising symbols suitable for use in a frequency domain parallel modulation system and defined in a complex space, wherein the starting symbol constellation does not comprise a symbol at a zero point in the complex space; and
   using said processor to locate or move one of the symbols of the starting symbol constellation at the zero point of the complex space; and
   using a processor to locate at least some of the symbols of the starting symbol constellation not located or moved in the preceding step closer to the zero point in the complex space so that a minimum symbol distance of the resulting modified constellation is equal to or greater than a minimum symbol distance of the starting symbol constellation.

2. A method of processing data for transmission on an OFDM channel comprising a method according to claim 1 and further comprising allocating bits of data to the modified symbol constellation.

3. A method according to claim 2, wherein said data is transmitted via a plurality of sub-carriers, wherein a power reception associated with at least two of the sub-carriers differs, the method further comprising allocating said symbol located at or moved to the zero point in the complex space to a sub-carrier that is associated with a power reception that is lower than a power reception of another sub-carrier.

4. A method according to claim 2, wherein said allocating bits of said data comprises allocating said bits of said data to said symbols of the modified symbol constellation so as to minimize peak to average power ratio.

5. A method according to claim 2, further comprising determining a peak to average power ratio for said allocation of data bits to the modified symbol constellation;
   allocating said bits of said data to said modified symbol constellation in a manner different from the bit to symbol allocation for which said peak to average power ratio has been determined;
   determining a peak to average power ratio for said different allocation; and
   selecting the allocation with the lower peak to average power ratio for transmission of the data.

6. A method according to claim 2, wherein a series of bits or bit combinations is mapped to the symbols of the modified constellation in a first order in one allocation and a second order in a second allocation, wherein in the second allocation an order of symbols is shifted relative to the series of bits or bit combinations when compared to the first order.

7. A method according to claim 5, wherein a series of bits or bit combinations is mapped to the symbols of the modified constellation in a first order in one allocation and wherein, in a second allocation, an order of symbols differs from an order of the one allocation in at least that a symbol has been inserted in a different position.

8. A method according to claim 2, wherein the step of allocating bits comprises the steps of:
mapping series of bits or bit combinations to symbols of the modified symbol constellation suitable for use in transmitting data in the frequency domain parallel modulation system in two or more different orders;
applying two or more different mappings to said data; and
selecting one of the applied mappings for transmission of the data.

9. A method of creating a symbol constellation for use in a frequency domain parallel modulation system, the method comprising, the steps of:
modifying a starting symbol constellation comprising symbols defined in an Argand diagram by placing one of the symbols at a zero point of the Argand diagram and modifying positions of at least some other symbols of the starting symbol constellation in the Argand diagram while maintaining a minimum symbol distance of the starting symbol constellation, wherein the starting symbol constellation is a QAM, PSK or HEX symbol constellation.

10. An apparatus arranged to modify a symbol constellation for use in data transmission in a frequency domain parallel modulation system, the apparatus comprising
a receiver configured to obtain a starting symbol constellation comprising symbols suitable for use in the frequency domain parallel modulation system and defined in a complex space, wherein the starting symbol constellation does not comprise a symbol at a zero point in the complex space; and
a processor arranged to locate or move one of the symbols of the starting symbol constellation at or to the zero point of the complex space,
wherein said processor is further arranged to locate at least some the symbols of the starting symbol constellation not located or moved closer to the zero point in the complex space so that a minimum symbol distance of the resulting modified constellation is equal to or greater than a minimum symbol distance of the starting symbol constellation.

11. An apparatus according to claim 10, further arranged to allocate bits of data to the modified symbol constellation.

12. An apparatus according to claim 11, wherein said data is transmitted via a plurality of sub-carriers, wherein a power reception associated with at least two of the sub-carriers differs, the apparatus further arranged to allocate said symbol located at or moved to the zero point in the complex space to a sub-carrier that is associated with a power reception that is lower than a power reception of another sub-carrier.

13. An apparatus according to claim 11, further arranged to allocate said bits of said data to said symbols of the modified symbol constellation so as to minimize a peak to average power ratio.

14. A data processing apparatus according to claim 10 arranged to map a series of bits or bit combinations of data to symbols of the modified symbol constellation in two or more different orders, to apply two or more different mappings to said data and to select one of the applied mappings for transmission of the data on a channel or channels of the frequency domain parallel modulation system.

15. A non-transitory computer readable medium storing a program that when executed by a computer causes the computer to execute a method of modifying a symbol constellation for use in a data transmission apparatus comprising the steps of:
receiving at a processor a starting symbol constellation comprising symbols suitable for use in a frequency domain parallel modulation system and defined in a complex space, wherein the starting symbol constellation does not comprise a symbol at a zero point in the complex space; and
using said processor to locate or move one of the symbols of the starting symbol constellation at the zero point of the complex space; and
using a processor to locate at least some of the symbols of the starting symbol constellation not located or moved in the preceding step closer to the zero point in the complex space so that a minimum symbol distance of the resulting modified constellation is equal to or greater than a minimum symbol distance of the starting symbol constellation.

* * * * *